United States Patent
Kawasaki et al.

(10) Patent No.: US 8,217,545 B2
(45) Date of Patent: Jul. 10, 2012

(54) ROTOR OF PERMANENT MAGNET ROTARY MACHINE AND MANUFACTURING METHOD OF ROTOR

(75) Inventors: Sachiko Kawasaki, Tokyo (JP); Hiroyuki Akita, Tokyo (JP); Masatsugu Nakano, Tokyo (JP); Yusuke Morita, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 364 days.

(21) Appl. No.: 12/559,773

(22) Filed: Sep. 15, 2009

(65) Prior Publication Data

US 2010/0207475 A1 Aug. 19, 2010

(30) Foreign Application Priority Data

Feb. 18, 2009 (JP) ................................. 2009-034804

(51) Int. Cl.
*H02K 1/27* (2006.01)
*H02K 21/12* (2006.01)
(52) U.S. Cl. ............... 310/156.08; 310/181; 310/156.56
(58) Field of Classification Search ............ 310/156.08, 310/181, 156.56
See application file for complete search history.

(56) References Cited

U.S. PATENT DOCUMENTS

| | | | | |
|---|---|---|---|---|
| 3,214,620 A | * | 10/1965 | Smith et al. ................... 310/181 |
| 4,745,312 A | * | 5/1988 | Nagasaka .................. 310/49.55 |
| 4,888,509 A | * | 12/1989 | Tomasek ...................... 310/68 B |
| 5,663,605 A | * | 9/1997 | Evans et al. ................... 310/181 |
| 5,717,316 A | * | 2/1998 | Kawai .............................. 322/46 |
| 5,747,909 A | * | 5/1998 | Syverson et al. ........ 310/156.56 |
| 5,753,989 A | * | 5/1998 | Syverson et al. ............. 310/114 |
| 5,881,448 A | * | 3/1999 | Molnar ........................... 29/598 |
| 6,093,986 A | * | 7/2000 | Windhorn ................... 310/68 B |
| 6,441,523 B1 | * | 8/2002 | Koharagi et al. ........ 310/156.28 |
| 6,664,672 B2 | * | 12/2003 | Kalsi et al. ...................... 310/57 |
| 6,664,688 B2 | * | 12/2003 | Naito et al. .............. 310/156.01 |
| 6,756,870 B2 | * | 6/2004 | Kuwahara ..................... 335/224 |
| 6,788,013 B2 | * | 9/2004 | Islam et al. .................... 318/432 |
| 6,847,143 B1 | * | 1/2005 | Akemakou ............... 310/156.43 |
| 6,856,051 B2 | * | 2/2005 | Reiter et al. .................... 310/44 |
| 6,885,122 B2 | * | 4/2005 | Kaneko et al. ........... 310/156.38 |
| 6,888,270 B2 | * | 5/2005 | Reiter et al. .................... 310/44 |

(Continued)

FOREIGN PATENT DOCUMENTS

EP 0 182 322 5/1986

(Continued)

OTHER PUBLICATIONS

Machine translation of foreign document JP 2003219618.*

(Continued)

*Primary Examiner* — Quyen Leung
*Assistant Examiner* — Alex W Mok
(74) *Attorney, Agent, or Firm* — Buchanan Ingersoll & Rooney PC

(57) ABSTRACT

A rotor of a rotary machine includes a rotary shaft, a rotor core fixed to a circumferential surface of the rotary shaft, a plurality of permanent magnets arranged on a circumferential surface of the rotor core at specific intervals along a circumferential direction thereof, conducting circuits arranged to surround the permanent magnets, and magnetic material pieces arranged on outer surfaces of the individual permanent magnets. Each of the conducting circuits includes a pair of first conductor sections arranged between magnetic poles formed by the adjacent permanent magnets and a pair of second conductor sections electrically connecting the first conductor sections.

12 Claims, 10 Drawing Sheets

U.S. PATENT DOCUMENTS

| | | | |
|---|---|---|---|
| 7,414,343 B2 * | 8/2008 | Arita et al. | 310/181 |
| 7,649,285 B2 * | 1/2010 | Ueda | 310/12.01 |
| 2001/0004173 A1 | 6/2001 | Mosimann | |
| 2003/0071531 A1 * | 4/2003 | DeCesare | 310/181 |
| 2004/0155537 A1 * | 8/2004 | Nakano et al. | 310/51 |
| 2006/0119206 A1 * | 6/2006 | Akemakou | 310/181 |
| 2007/0090713 A1 * | 4/2007 | Arita et al. | 310/181 |
| 2007/0222304 A1 * | 9/2007 | Jajtic et al. | 310/12 |
| 2008/0174199 A1 * | 7/2008 | Ishigami et al. | 310/199 |
| 2008/0238237 A1 | 10/2008 | Nishihama et al. | |
| 2008/0284269 A1 * | 11/2008 | Tajima et al. | 310/156.46 |
| 2009/0079276 A1 * | 3/2009 | Ueda | 310/28 |
| 2009/0152956 A1 * | 6/2009 | Yang | 310/12 |
| 2009/0189471 A1 | 7/2009 | Amano et al. | |

FOREIGN PATENT DOCUMENTS

| | | |
|---|---|---|
| EP | 1 109 301 | 6/2001 |
| EP | 1 354 653 | 10/2003 |
| JP | 02-311156 | 12/1990 |
| JP | 09-056193 A | 2/1997 |
| JP | 2000-116091 | 4/2000 |
| JP | 2001-115963 A | 4/2001 |
| JP | 2003-219618 A | 7/2003 |
| JP | 2005-065415 | 3/2005 |
| JP | 2005-117858 A | 4/2005 |
| JP | 2006-109663 A | 4/2006 |
| JP | 2007236160 A * | 9/2007 |
| JP | 2008-245440 | 10/2008 |
| JP | 2009-033907 | 2/2009 |
| JP | 2009/033908 | 2/2009 |
| WO | WO 2006112150 A1 * | 10/2006 |

OTHER PUBLICATIONS

Nondahl et al., "A Permanent Magnet Rotor Containing an Electrical Winding to Improve Detection of Rotor Angular Position" Industry Applications Conference, Thirty-third IAS Annual Meeting, (1998) vol. 1, pp. 359-363, XP010313188.

Nondahl et al., A Permanent-Magnet Rotor Containing an Electrical Winding to Improve Detection of Rotor Angular Position IEEE Transactions on Industry Applications, IEEE Service Center, (1999), vol. 35, No. 4, pp. 819-824, XP011022614.

European Search Report dated Feb. 15, 2011, issued in the corresponding European Patent Application No. 09173496.2-1242.

Office Action (Notice of Reasons for Rejection) dated Nov. 30, 2010, issued in the corresponding Japanese Patent Application No. 2009-034804, and an English Translation thereof.

* cited by examiner

ROTOR OF PERMANENT MAGNET ROTARY MACHINE AND MANUFACTURING METHOD OF ROTOR

BACKGROUND OF THE INVENTION

1. Field of the Invention

The present invention relates to a structure of a rotor of a permanent magnet rotary machine in which the rotor rotates without using commutators as well as to a method of manufacturing such a rotor.

2. Description of the Background Art

Japanese Patent Application Publication No. 1997-56193 describes a rotor configured with permanent magnets used in a conventional sensorless, brushless DC motor. According to the Publication, the rotor has nonmagnetic layers made of an electrically conductive nonmagnetic material formed on a circumferential surface in an angular region (e.g., 80 to 100 degrees in terms of electrical angle) from a boundary between one north pole and an adjacent south pole of the rotor in a forward running direction and in a similar angular region from the boundary of the two poles in a reverse running direction opposite to the forward running direction.

Japanese Patent Application Publication No. 2006-109663 also describes a rotor of a conventional brushless motor. According to this Publication, a cylindrical member is fixedly fitted on the rotor, wherein an electrical or magnetic property of the cylindrical member with respect to driving coils of individual phases is varied in a circumferential direction so that inductances of the driving coils of the individual phases vary with the angle of rotation of the rotor relative to the individual driving coils.

There is a growing demand in recent years for a reduction in cost and size of a permanent magnet rotary machine (hereinafter referred to simply as the rotary machine) which is increasingly used in every kind of product. Sensorless driving technology requiring no angle sensor is one of means which can meet this demand. For a rotary machine installed in a product used under harsh environmental conditions (such as an electric power steering system), a capability to drive the rotary machine sensorlessly confers a great advantage.

Known among various forms of the sensorless driving technology which enable detection of the angular position of a rotor throughout low to high speed ranges thereof is a method based on the use of saliency of the rotor of the rotary machine. One well known example of the rotor of the rotary machine having saliency is an interior permanent magnet (IPM) rotor. The IPM rotor, however, has such problems as substantial leakage of magnetic flux within the rotor and distortion of surface flux distribution. Thus, the rotary machine employing the IPM rotor has been regarded as unsuitable for use in such a product that is required to operate with low noise and vibration, yet producing a high torque.

Under such circumstances, the aforementioned conventional rotary machines employ a surface permanent magnet (SPM) rotor which produces less leakage of magnetic flux within the rotor with a layer of a nonmagnetic or magnetic material disposed on the outer surface of the SPM rotor to impart saliency to the rotor. In the rotary machine thus structured, the angular position of the rotor is detected by measuring variations in impedances of driving coils on a stator side which occur when a voltage is applied to the rotary machine.

It is however difficult to produce sufficiently large variations in impedances in the conventional rotary machine that are needed for detecting the angular position of the rotor. Therefore, in the rotary machine of Japanese Patent Application Publication No. 1997-56193 cited above, it is necessary to apply a high-frequency voltage having a large amplitude in order to increase impedance variations. This approach however poses a problem that application of the high-frequency voltage of an increased amplitude would result in an increase in operating noise and vibration of the rotary machine.

In the rotary machine described in Japanese Patent Application Publication No. 2006-109663, on the other hand, it is necessary to increase variations in the electrical or magnetic property of the cylindrical member in order to increase impedance variations. For this purpose, the cylindrical member is structured to greatly vary in thickness so that the cylindrical member has a high eccentricity, or slits are formed in the cylindrical member having a uniform thickness. The cylindrical member thus structured may cause low-order cogging torque components to occur if the cylindrical member is made of a magnetic material, for instance, or the cylindrical member thus structured may make management of dimensions of the rotor difficult due to nonuniform mechanical gaps.

SUMMARY OF THE INVENTION

The present invention is intended to overcome the aforementioned problems of the prior art. Accordingly, it is an object of the invention to provide a rotor of a permanent magnet rotary machine which can provide improved saliency of the rotor without increasing noise or vibration produced thereby, yet facilitating detection of the angular position of the rotor.

According to the invention, a rotor of a permanent magnet rotary machine includes a rotary shaft, a rotor core fixed to a circumferential surface of the rotary shaft, a plurality of permanent magnets arranged on a circumferential surface of the rotor core at specific intervals along a circumferential direction thereof, a conducting circuit arranged to surround at least one of the permanent magnets forming one magnetic pole, the conducting circuit including a pair of first conductor sections arranged between magnetic poles formed by the adjacent permanent magnets and a second conductor section electrically connecting the first conductor sections, and a magnetic material piece arranged on an outer surface of the at least one permanent magnet surrounded by the conducting circuit.

A method of manufacturing a rotor according to the present invention is a method of manufacturing the rotor of a permanent magnet rotary machine which includes a rotary shaft, a rotor core fixed to a circumferential surface of the rotary shaft, a plurality of permanent magnets arranged on a circumferential surface of the rotor core at specific intervals along a circumferential direction thereof, a conducting circuit arranged to surround at least one of the permanent magnets forming one magnetic pole, the conducting circuit including a pair of first conductor sections arranged between magnetic poles formed by the adjacent permanent magnets and a second conductor section electrically connecting the first conductor sections, and a magnetic material piece arranged on an outer surface of the at least one permanent magnet surrounded by the conducting circuit, wherein the magnetic material piece is a generally cylindrical magnetic material piece including magnetic pole portions arranged on the outer surfaces of the permanent magnets and thin-walled intra-pole portions interconnecting the individual magnetic pole portions. The magnetic material piece is formed by forming a magnetic material sheet having grooves which serve as the intra-pole portions and thick-walled parts which serve as the magnetic pole portions by etching a workpiece, and forming the generally cylindrical magnetic material piece by joining opposite ends of the magnetic material sheet to each other.

In the aforementioned rotor of the rotary machine of the invention, the conducting circuit is arranged to surround at least one permanent magnet on which the magnetic material piece is arranged. The rotor thus structured can provide increased saliency. This structure of the invention makes it possible to provide a permanent magnet rotary machine capable of operating with low noise and vibration, in which the angular position of the rotor can be detected with high accuracy even when the value of high-frequency current applied to the rotary machine is small.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

The invention is now described in detail, by way of example, with reference to the accompanying drawings.

First Embodiment

Figure 1:
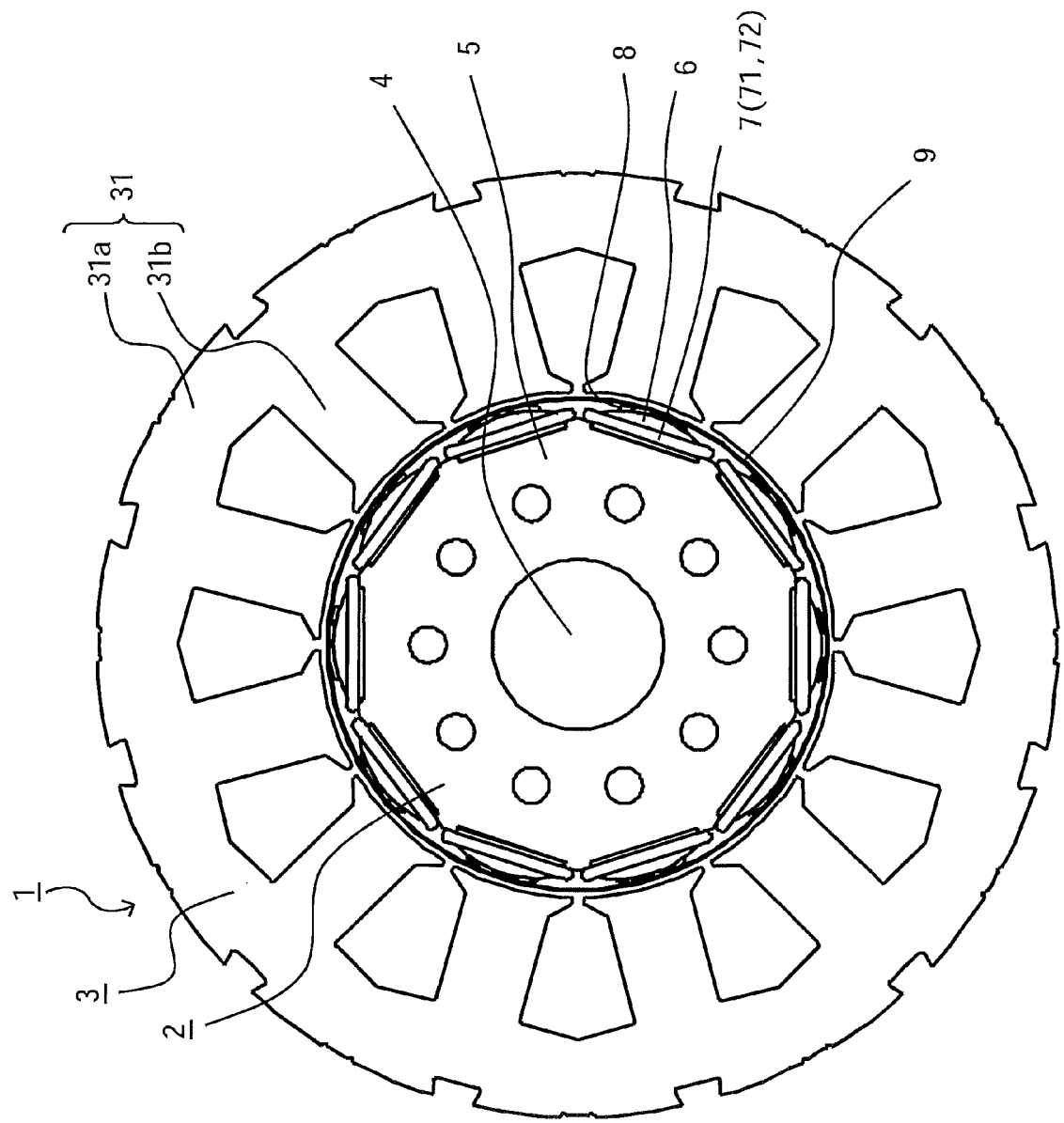
FIG. 1 is a plan view showing the structure of a rotary machine according to a first embodiment of the invention.
Figure 2:
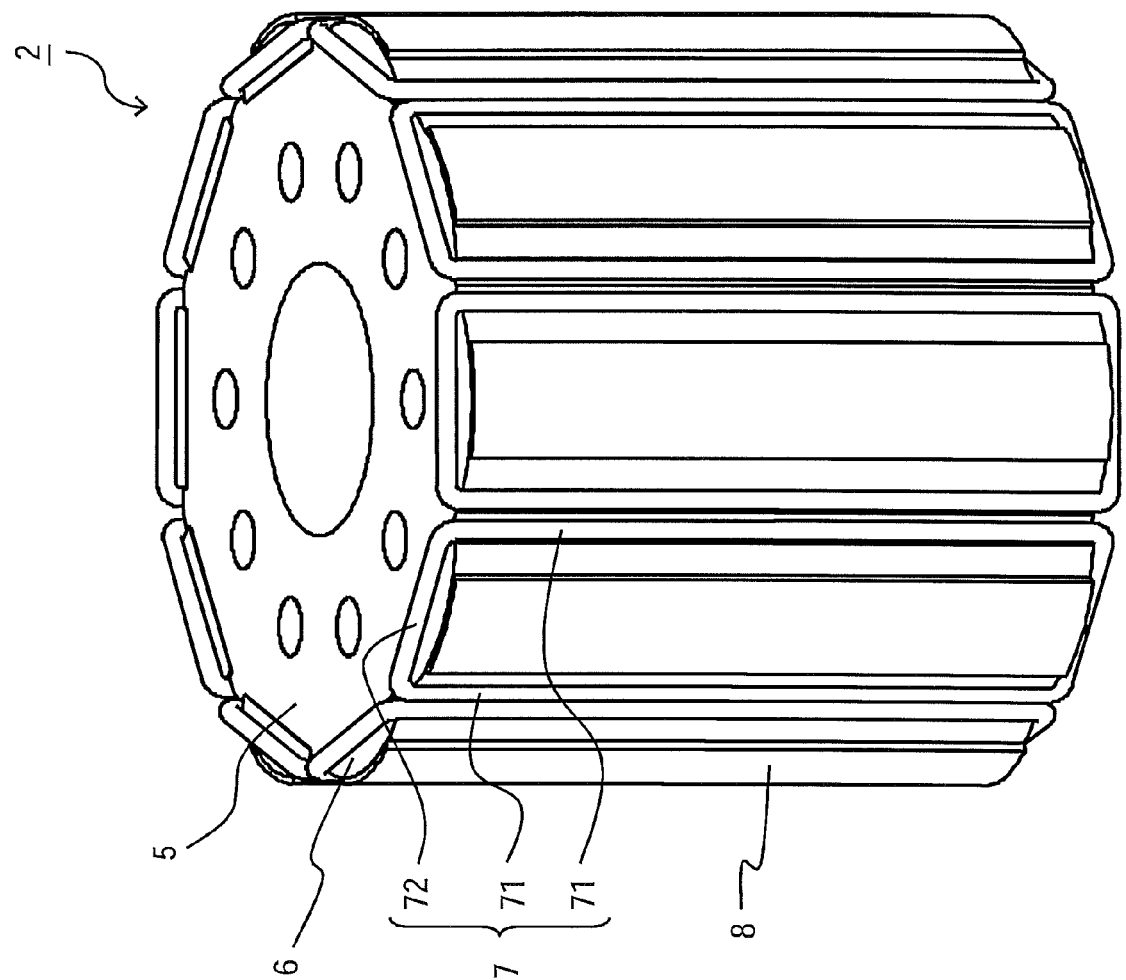
FIG. 2 is a perspective view showing the structure of a rotor of the rotary machine of the first embodiment.

FIG. 1 is a plan view showing the structure of a permanent magnet rotary machine (hereinafter referred to simply as the rotary machine) 1 according to a first embodiment of the invention, and FIG. 2 is a perspective view of a rotor 2 of the rotary machine 1.

As shown in FIGS. 1 and 2, the rotary machine 1 includes the rotor 2 and a stator 3 arranged to surround a circumferential surface of the rotor 2. The rotor 2 and the stator 3 are disposed with a specific air gap therebetween. Although not illustrated in detail, the stator 3 includes a stator core 31 having a yoke 31a and teeth 31b and stator coils 32 (not shown) wound around the individual teeth 31b.

The rotor 2 includes a rotary shaft 4, a rotor core 5 fixed around a circumferential surface of the rotary shaft 4, a plurality of permanent magnets 6 arranged on a circumferential surface of the rotor core 5 at specific intervals along a circumferential direction thereof, a plurality of conducting circuits 7 arranged to surround the individual permanent magnets 6, each conducting circuit 7 including a pair of first conductor sections 71 arranged generally parallel to the rotary shaft 4 between magnetic poles formed by the adjacent permanent magnets 6 and a pair of second conductor sections 72 electrically connecting the first conductor sections 71, pieces of magnetic material 8 arranged on outer surfaces of the individual permanent magnets 6 and a binding member 9 having a generally cylindrical shape to surround an outermost surface of the rotor 2. It is to be noted that the rotary shaft 4 and the binding member 9 are not shown in FIG. 2 for ease of understanding of the structure of the rotor 2.

The structure of the rotor 2 is described in further detail hereunder. The individual permanent magnets 6 form magnetic poles of the rotor 2 in such a manner that the magnetic poles having different polarities are alternately arranged around the circumferential surface of the rotor core 5 at equal intervals in the circumferential direction thereof. In the present embodiment, a total of 10 magnetic poles are arranged around the rotor core 5.

As an example, the rotor 2 of this embodiment is configured such that each pair of first conductor sections 71 is arranged on one of the permanent magnets 6 along both circumferential ends of the permanent magnet 6 in contact therewith and the second conductor sections 72 arranged on both axial end surfaces of the rotor core 5 interconnect ends of the pair of first conductor sections 71, so that each of the permanent magnets 6 is surrounded by one of the conducting circuits 7.

One method of manufacturing the conducting circuit 7 is to wind a magnet wire on each permanent magnet 6 around an outer shape thereof and join ends of the magnet wire, for example. This method makes it possible to manufacture the conducting circuits 7 at a high material yield. Another method of manufacturing the conducting circuit 7 is to expand an electrically conductive tube, such as a copper tube, to fit the outer shape of each permanent magnet 6. This method makes it possible to manufacture the conducting circuits 7 at a high material yield without soldering or welding the tube ends.

While the conducting circuits 7 are provided on all of the permanent magnets 6 in the first embodiment, the invention is not necessarily limited to this arrangement pattern of the conducting circuits 7. What is essential in this invention is that at least one conducting circuit 7 be arranged to surround one of the permanent magnets 6 forming one magnetic pole and, thus, the conducting circuits 7 may be arranged in various ways with respect to the number and locations of the conducting circuits 7. For example, the rotor 2 may have one only conducting circuit surrounding the permanent magnets 6 forming two magnetic poles or a plurality of conducting circuits arranged to surround every second permanent magnet 6. Additionally, the conducting circuits 7 need not necessarily be arranged at equal intervals. If the conducting circuits 7 are arranged such that the interval between the adjacent conducting circuits 7 is an integral multiple of the interval (e.g., 36 degrees in the case of the rotor 2 having 10 magnetic poles) between the adjacent permanent magnets 6, for example, it is possible to produce impedance variations corresponding to the intervals of the permanent magnets 6.

The magnetic material pieces 8 are arranged between the permanent magnets 6 and the generally cylindrical binding member 9 at equal intervals in the circumferential direction, each of the magnetic material pieces 8 covering the outer surface of the permanent magnets 6 at a middle part of the magnetic pole of the pertinent permanent magnet 6 (i.e., the middle part thereof in the circumferential direction). The width of each magnetic material piece 8 (i.e., the dimension thereof measured in the circumferential direction) is made equal to or smaller than the width of each permanent magnet 6 (i.e., the dimension thereof measured in the circumferential direction). Considering that an ordinary small-sized rotary machine has a mechanical gap of approximately 0.3 to 1.0 mm between a rotor and a stator, each of the magnetic material pieces 8 should preferably have a thickness (i.e., the dimension measured in a radial direction) of approximately 0.1 to 0.5 mm. Preferably, the magnetic material pieces 8 are made of a material having a permeability approximately as high as that of the rotor core 5 and having a lower electric conductivity than that of the conducting circuits 7. Thus, the magnetic material pieces 8 are made of an electromagnetic steel sheet, for example. If the magnetic material pieces 8 are thin-walled, having a thickness of approximately 0.1 to 0.5 mm as mentioned above, it is possible to form the magnetic material pieces 8 by using a general-purpose electromagnetic steel sheet.

While the magnetic material pieces 8 are arranged on all of the permanent magnets 6 forming the 10 magnetic poles in the first embodiment, the invention is not necessarily limited to this arrangement. What is essential in this invention is that the magnetic material piece 8 be arranged at least on each permanent magnet 6 surrounded by the conducting circuit 7.

In the rotary machine 1 thus configured, the angular position of the rotor 2 is detected by injecting a high-frequency current having a frequency higher than a driving current fed into the rotary machine 1 into the stator coils 32 (not shown) and measuring variations in impedances of the stator coils 32.

Figure 3:
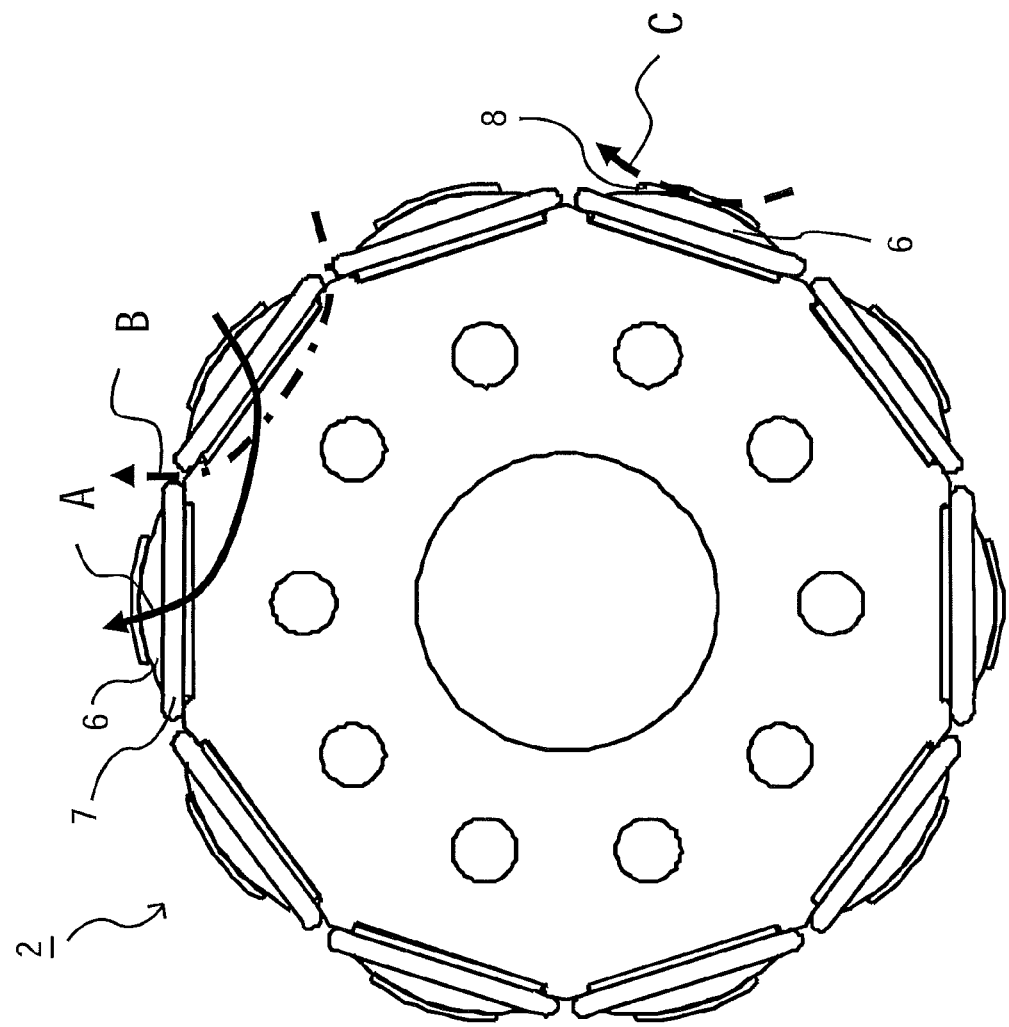
FIG. 3 is a plan view for explaining a characteristic feature of the rotor of the rotary machine of the first embodiment.

Discussed below with reference to FIG. 3 is a characteristic feature of the rotor 2 of the embodiment concerning detection of the angular position of the rotor 2 produced by the provision of the conducting circuits 7 and the magnetic material pieces 8 in the rotor 2.

As magnetic flux produced by the high-frequency current injected into the stator coils 32 passes through, or becomes linked with, each of the conducting circuits 7 arranged to surround the permanent magnets 6, there is produced an induction current which flows through each of the conducting circuits 7. The amount of this induction current varies with the value of the magnetic flux linked with the individual conducting circuits 7. Then, the impedance (or an inductance component of the impedance) of each stator coil 32 varies due to variations in the induction current.

When the magnetic flux is linked with the conducting circuit 7 in a d-axis direction (shown by an arrow "A" in a solid line in FIG. 3) which is the same direction as the direction of the magnetic pole, the value of the magnetic flux linked with the conducting circuit 7 is maximized and, in this case, the induction current flowing through the conducting circuit 7 is also maximized. As a result, the magnetic flux is canceled out and the impedance of the pertinent stator coil 32 is minimized.

When the magnetic flux is linked with the conducting circuit 7 in a q-axis direction (shown by an arrow "B" in a dot-and-dash line in FIG. 3) which is perpendicular to the direction of the magnetic pole, on the other hand, the value of the magnetic flux linked with the conducting circuit 7 is zeroed, so that no induction current flows through the conducting circuit 7. As a result, the impedance of the pertinent stator coil 32 is maximized.

Since the magnetic material pieces 8 arranged on the outer surfaces of the individual permanent magnets 6 are made of a material having a high permeability as mentioned above, the magnetic material pieces 8 have a high permeance in the q-axis direction so that the magnetic flux can easily pass through the magnetic material piece 8 (shown by an arrow "C" in a broken line in FIG. 3). As the impedance of each stator coil 32 is proportional to this permeance, the impedance is minimized in the d-axis direction and maximized in the q-axis direction. This pattern coincides with a pattern of variations in the impedances of the stator coils 32 by the conducting circuits 7. It is to be noted that if the magnetic material pieces 8 are made of a material having a high permeability and a low electric conductivity, it is possible to reduce an effect of the induction current (eddy current) flowing in each magnetic material piece 8 due to the low electric conductivity. Also, if the magnetic material pieces 8 are arranged at equal intervals at the middle parts of the magnetic poles formed by the individual permanent magnets 6, it is possible to prevent the occurrence of low-order cogging torque components.

The above-described structure of the rotor 2 makes it possible to impart increased saliency to the rotor 2 and thus increase a difference in impedance of the stator coils 32 between the d-axis direction and the q-axis direction. It will be understood from the foregoing discussion that the angular position of the rotor 2 can easily be detected by injecting the high-frequency current having a frequency higher than the driving current fed into the rotary machine 1 into the stator coils 32 of the rotary machine 1 and measuring variations in the impedances thereof.

As thus far described, the rotor 2 of the first embodiment has high saliency although the rotor 2 is an SPM rotor. This is because the conducting circuits 7 are arranged to surround the permanent magnets 6 and the magnetic material pieces 8 are arranged on the outer surfaces of the individual permanent magnets 6. Therefore, large impedance variations are obtained even when the high-frequency current applied from the side of the stator 3 is small, so that it is possible to detect the angular position of the rotor 2 with high accuracy and provide a rotary machine of which operating noise and vibration are suppressed.

Furthermore, since the angular position of the rotor 2 is detected by measuring variations in the impedances of the stator coils 32, it is not necessary to additionally provide an angular position sensing device, such as a resolver or an encoder. This makes it possible to achieve a reduction in size and weight of the rotary machine 1 as well as a reduction in size and weight of packing material. Moreover, since the angular position sensing device like a resolver is not required, it is possible to improve durability of the rotary machine 1 and use the same for a prolonged period of time.

Second Embodiment

While the rotor 2 of the rotary machine 1 of the foregoing first embodiment is structured such that the conducting circuits 7 provided independently of one another are arranged to surround the individual permanent magnets 6, a rotary machine according to a second embodiment of the invention described hereunder has a conducting circuit 11 which is configured differently as compared to the first embodiment. It is to be noted that elements identical or similar to those of the first embodiment are designated by the same reference numerals in the following discussion and accompanying drawings and a description of such elements is not given below.

Figure 4:
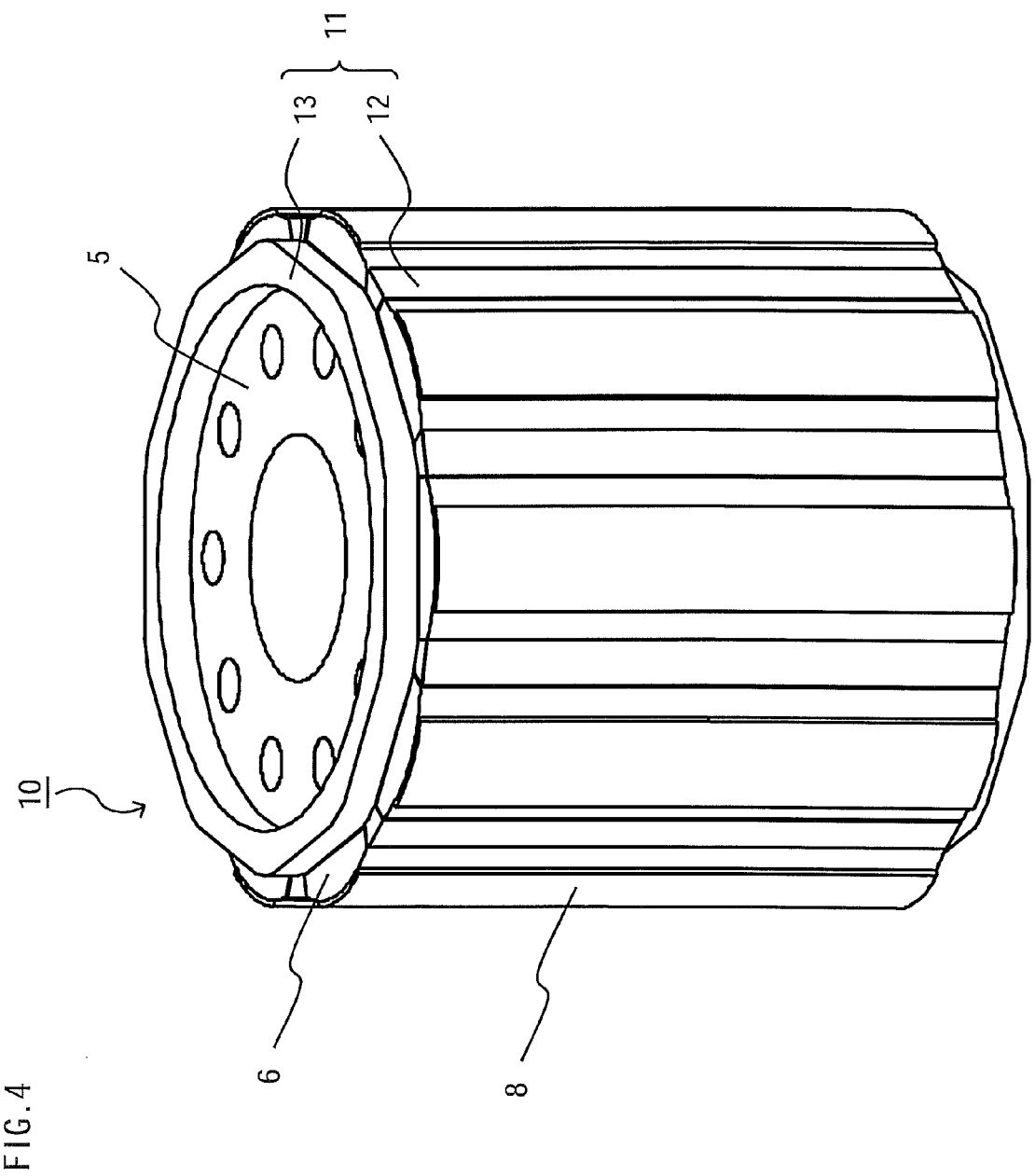
FIG. 4 is a perspective view showing the structure of a rotor of a rotary machine according to a second embodiment of the invention.

FIG. 4 is a perspective view showing the structure of a rotor 10 according to a second embodiment. To facilitate understanding of the structure of the rotor 10, the rotary shaft 4 and the binding member 9 are not shown in FIG. 4.

Referring to FIG. 4, the conducting circuit 11 of the rotor 10 is configured with a plurality of first conductor sections 12 arranged to extend generally parallel to the rotary shaft 4 between magnetic poles formed by the adjacent permanent magnets 6 and generally ring-shaped second conductor sections 13 disposed on both axial end surfaces of the rotor core 5, the second conductor sections 13 being electrically connected to opposite axial ends of all of the first conductor sections 12. All of the first conductor sections 12 disposed between the magnetic poles of the individual permanent magnets 6 are short-circuited by the second conductor sections 13 all along the circumferential direction, the first conductor sections 12 and the second conductor sections 13 together forming the single-structured conducting circuit 11 which surrounds the individual permanent magnets 6. Each of the first conductor sections 12 constituting part of the conducting circuit 11 is shared by the two permanent magnets 6 disposed adjacent to the first conductor section 12.

While the first conductor sections 12 are arranged between all of the adjacent magnetic poles in the present embodiment, the first conductor sections 12 need not necessarily be arranged between all of the magnetic poles. The first conductor sections 12 may be arranged in any desired pattern with respect to the number and locations thereof if the conducting circuit 11 configured with the first and second conductor sections 12, 13 is disposed to surround the permanent magnet 6 forming at least one magnetic pole.

One method of manufacturing the conducting circuit 11 is a die casting process, in which the rotary shaft 4 and the rotor core 5 are fitted in a metal die (not shown) at first and, then, a molten electrically conductive material, such as aluminum or copper, is filled in the metal die to form the conducting circuit 11 including the first and second conductor sections 12, 13. This method makes it possible to form the conducting circuit 11 easily and fix the conducting circuit 11 to the rotor core 5 at the same time. Since the conducting circuit 11 is easily formed on the rotor core 5 in this method, it is possible to use the conducting circuit 11 as a guide member when positioning and fixing the permanent magnets 6 to the circumferential surface of the rotor core 5.

As the conducting circuit 11 is arranged to surround the permanent magnets 6 in the rotor 10, the above-described structure of the second embodiment produces the same advantageous effect as the foregoing first embodiment. Specifically, with the provision of the conducting circuit 11 which draws a varying amount of induction current according to the value of magnetic flux linked with the conducting circuit 11 and the magnetic material pieces 8 arranged on the outer surfaces of the permanent magnets 6 to make it easier for the magnetic flux to pass in the q-axis direction, it is possible to increase a difference in impedances of the stator coils 32 between the d-axis direction and the q-axis direction that occurs when a high-frequency current is applied from the stator coils 32 of the stator 3.

The conducting circuit 11 of the second embodiment is configured differently from the conducting circuits 7 of the first embodiment as described above. Described below is how these differently configured conducting circuits 7, 11 differ in operational effects thereof.

Figure 5:
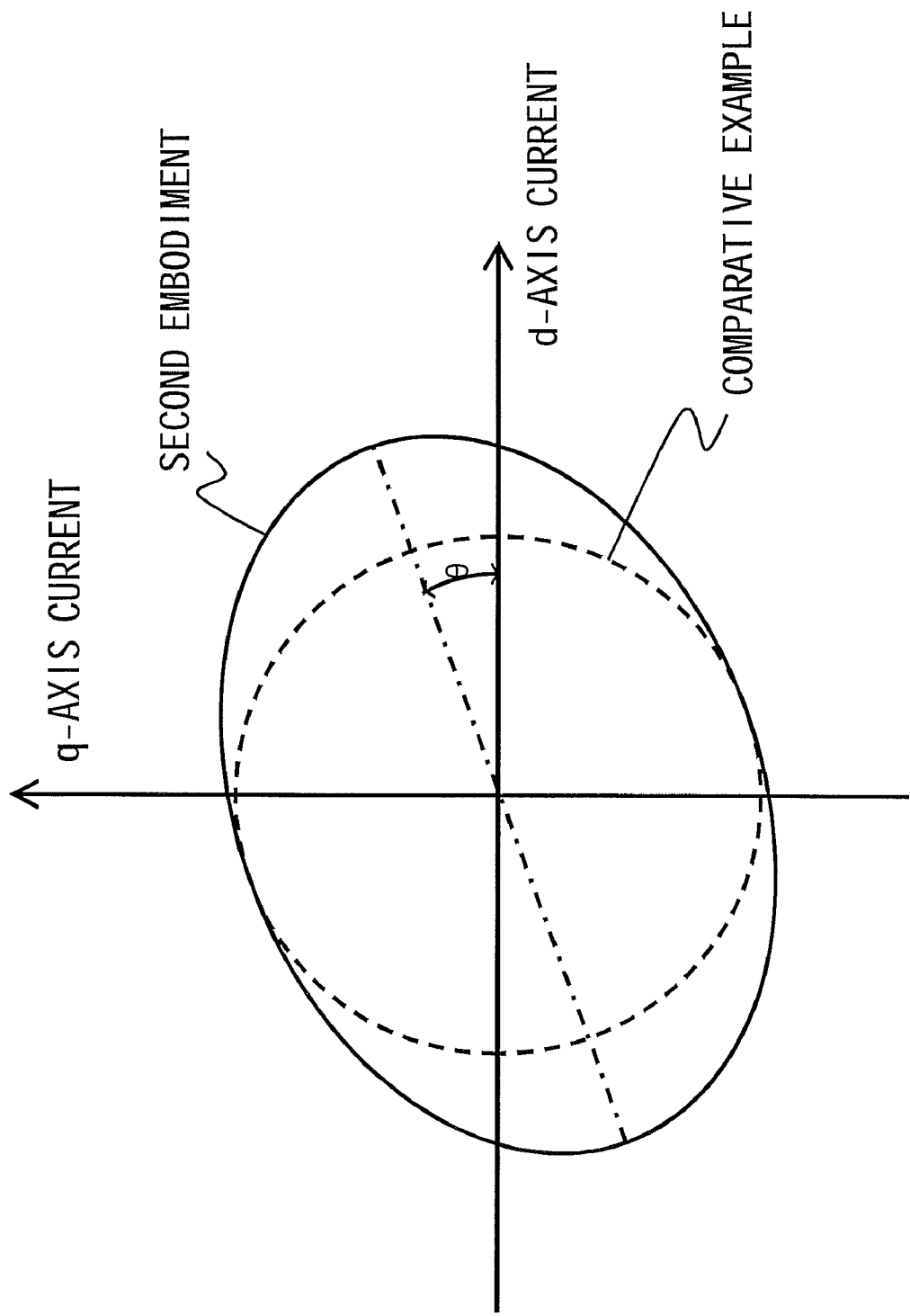
FIG. 5 is a diagram showing a Lissajous figure obtained through a process of d-q axis conversion of a high-frequency current applied to the rotary machine of the second embodiment, a horizontal axis representing a d-axis current and a vertical axis representing a q-axis current, together with a Lissajous figure obtained with a comparative rotary machine.

FIG. 5 is a Lissajous figure (shown by a solid line) showing a tracing of a current vector obtained through a process of d-q axis conversion of the high-frequency current injected into the rotary machine employing the rotor 10 of the second embodiment, a horizontal axis indicating a d-axis current and a vertical axis indicating a q-axis current. For the purpose of comparison, FIG. 5 also shows a Lissajous figure (shown by a broken line) obtained with a rotary machine (hereinafter referred to as the comparative rotary machine) employing a conventional SPM rotor having no saliency. The high-frequency current is injected under conditions where driving currents (load currents) are fed into the respective rotary machines.

As can be seen from FIG. 5, the Lissajous figure obtained with the comparative rotary machine having no saliency has a circular pattern. By comparison, the Lissajous figure obtained with the rotary machine employing the rotor 10 of the second embodiment having saliency shows an elliptical pattern of which major axis (shown by a dot-and-dash line in FIG. 5) represents the d-axis current. The higher the saliency, the larger the difference in impedances between the d-axis and q-axis directions and, thus, the longer the major axis of the elliptical pattern. The major axis of the Lissajous figure obtained with the rotary machine employing the rotor 10 of the second embodiment is inclined by a particular angle (shown by $\theta$ in FIG. 5) from the d-axis direction due to an influence of the driving currents (load currents) fed into the rotary machine. This inclination of the major axis is supposed to occur due to an imbalance between the amounts of magnetic flux passed in the d-axis and q-axis directions as a result of magnetic saturation of a stator core of the rotary machine. The angle of inclination of the major axis of the elliptical pattern can be used as a guide indicating an angular position sensing error. Specifically, the larger the angle of inclination of the major axis, the larger the angular position sensing error.

Figure 6:
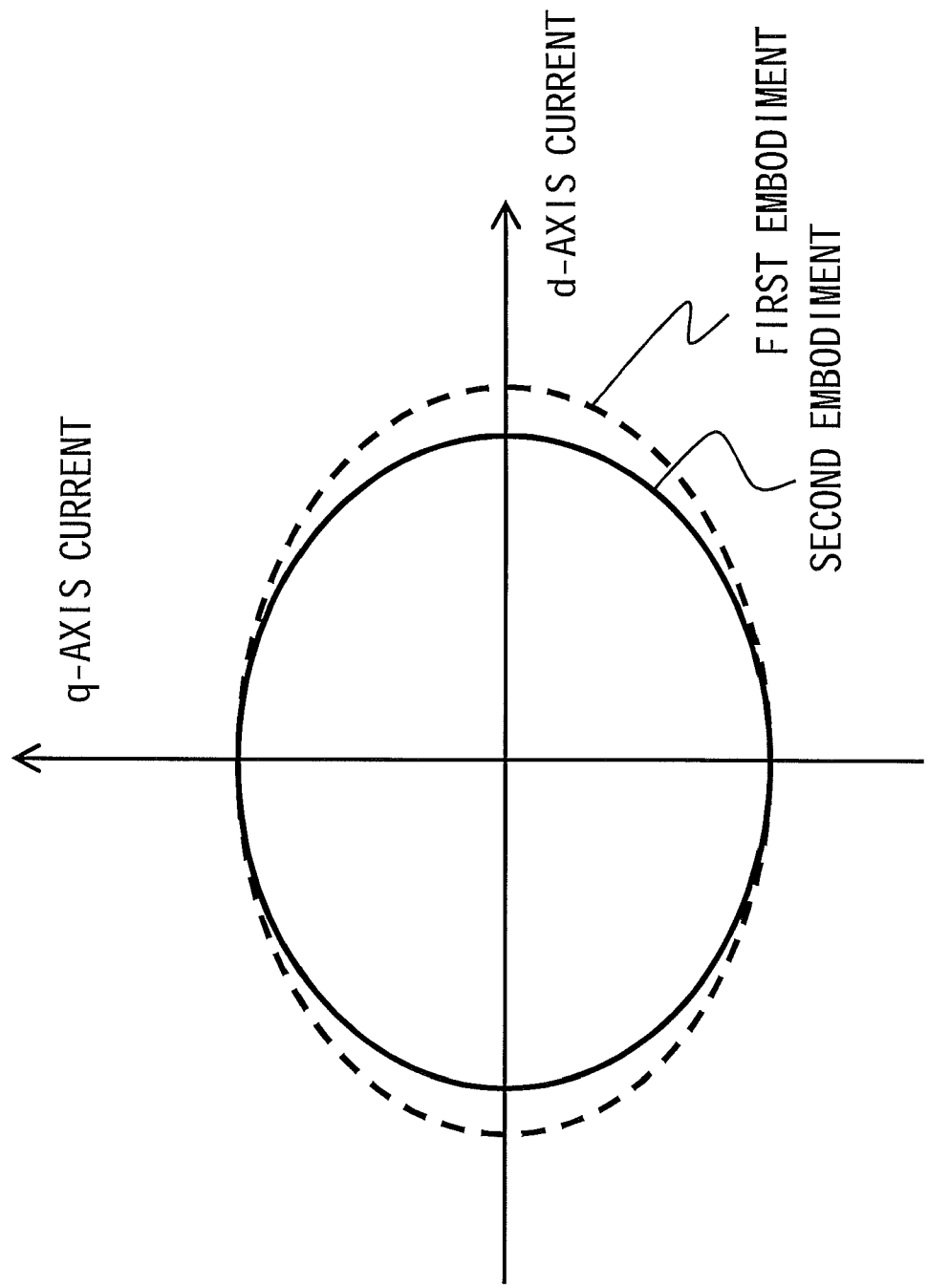
FIG. 6 is a diagram showing Lissajous figures obtained by actual measurement of the rotary machines employing the rotors of the first and second embodiments.

FIG. 6 is a diagram showing Lissajous figures obtained by actual measurement of the rotary machines employing the rotors 2, 10 of the first and second embodiments. It is to be noted that FIG. 6 shows the Lissajous figures obtained when a 10 kHz high-frequency current is injected into the rotary machines under non-load (zero load current) conditions.

Shown by a broken line in FIG. 6 is the Lissajous figure obtained with the rotary machine of the first embodiment, and shown by a solid line in FIG. 6 is the Lissajous figure obtained with the rotary machine of the second embodiment. It can be seen from FIG. 6 that the major axis of the Lissajous figure obtained with the rotary machine of the first embodiment is longer than that of Lissajous figure obtained with the rotary machine of the second embodiment, that it to say the rotor 2 of the rotary machine of the first embodiment has higher saliency than the rotor 10 of the rotary machine of the second embodiment. This indicates that, compared to the rotary machine of the second embodiment, the rotary machine of the first embodiment makes it possible to decrease the amplitude or frequency of the injected high-frequency current and suppress operating noise and vibration to a greater extent.

Figure 7:
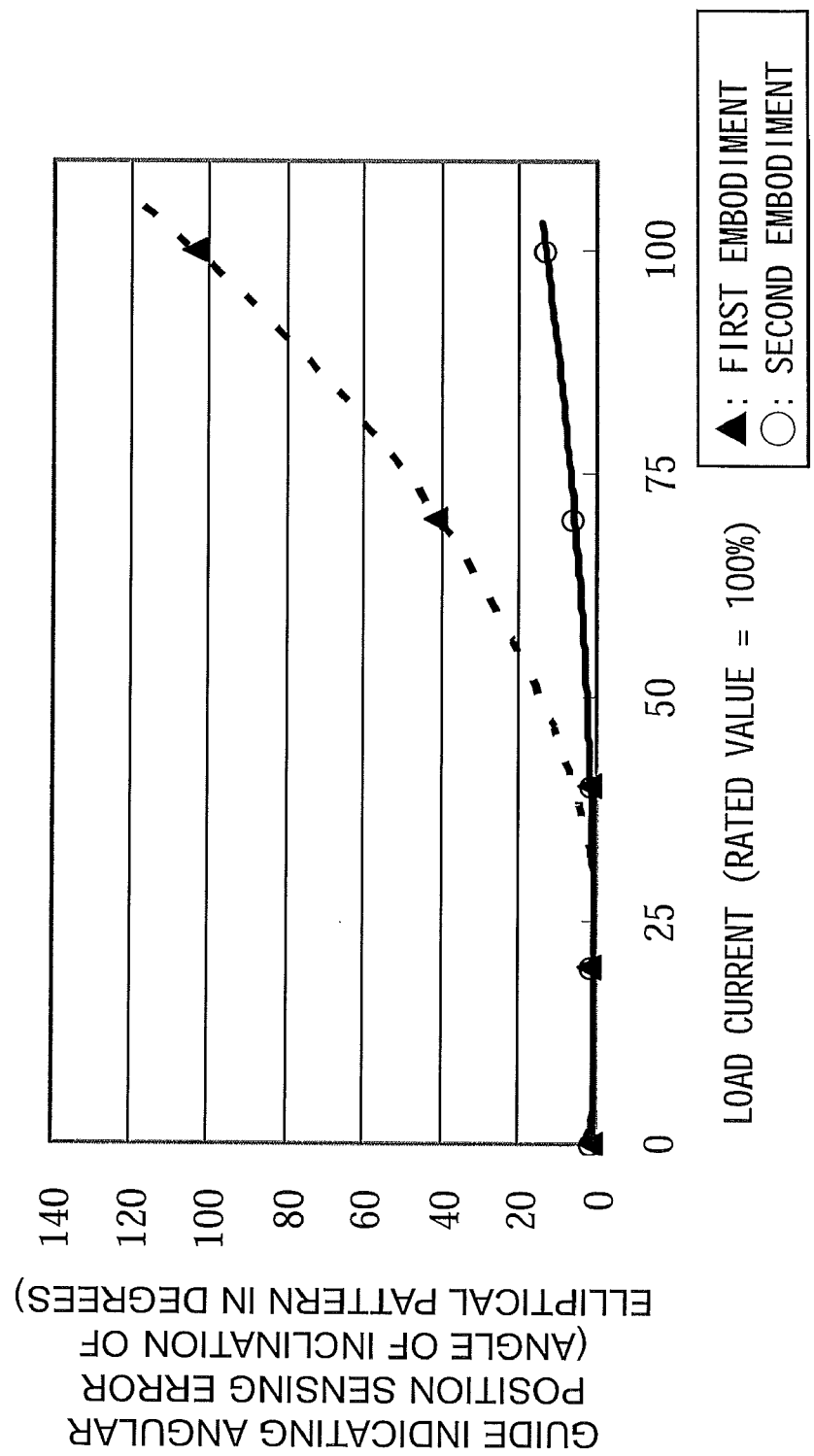
FIG. 7 is a diagram showing a relationship between the angle of inclination of the Lissajous figures obtained with the rotary machines of the first and second embodiments and the value of a load current fed thereinto.

The rotary machines of the first and second embodiments were tested by injecting the 10 kHz high-frequency current while varying the load current from zero upward. FIG. 7 shows test results derived from Lissajous figures thus obtained, a horizontal axis indicating the value of the load current and a vertical axis indicating the angle of inclination (shown by $\theta$ in FIG. 5) of the elliptical pattern of each Lissajous figure.

Shown by a broken line in FIG. 7 is the test result obtained with the rotary machine of the first embodiment, the symbol "▲" indicating individual measurements, and shown by a solid line in FIG. 7 is the test result obtained with the rotary machine of the second embodiment, the symbol "○" indicating individual measurements. It is understood from FIG. 7 that, as the load current is increased, the angle of inclination of the elliptical pattern of the Lissajous figure increases at a smaller ratio in the second embodiment than in the first embodiment. This means that the rotary machine of the second embodiment makes it possible to lower the angular position sensing error of the rotor 10 compared to the rotary machine of the first embodiment even when the load current is large. This result is supposed to be attributable to the aforementioned configuration of the conducting circuit 11 of the second embodiment. Since the conducting circuit 11 is configured with all of the first conductor sections 12 arranged between the individual magnetic poles short-circuited by the second conductor sections 13, the conducting circuit 11 of the second embodiment provides a higher degree of freedom in designing a current path. Consequently, an induction current flowing around each magnetic pole is affected by induction currents flowing around the other magnetic poles so that mutual interference between the d-axis and q-axis currents is reduced. Thus, it is supposed that the configuration of the conducting circuit 11 of the second embodiment serves to prevent an imbalance between the amounts of magnetic flux passed in the d-axis and q-axis directions.

Described below is how the conducting circuits 7, 11 of the first and second embodiments differ from a viewpoint of the manufacturing method.

As described in the foregoing first embodiment, the conducting circuits 7 of the first embodiment are configured to surround the individual permanent magnets 6 independently of one another. Therefore, it is possible to handle the permanent magnets 6 and the conducting circuits 7 as a single structure so that the permanent magnets 6 and the conducting circuits 7 can be easily assembled with the rotor core 5 and easily separated therefrom for the purpose of recycling when necessary.

On the other hand, the conducting circuit 11 of the second embodiment can be easily manufactured at low cost by the die casting process, for example, so that the structure of the second embodiment is advantageous when the rotors 10 are manufactured in large quantity.

The conducting circuits 7, 11 of the first and second embodiments produce different advantageous effects as mentioned above. The conducting circuits 7, 11 of the first and second embodiments configured as thus far described may be chosen as appropriate depending on such specifications as torque or cost required by the rotary machine to be manufactured.

As thus far discussed, the rotor 10 of the second embodiment provides increased saliency due to the above-described arrangement of the conducting circuit 11 and the magnetic material pieces 8. In particular, the arrangement of the second embodiment makes it possible to precisely detect the angular position of the rotor 10 with minimal error even when the rotor 10 is used in a high-torque rotary machine requiring a large load current. Also, since the rotor 10 of the second embodiment can be easily manufactured at low cost by the die casting process, for example, the structure of the second embodiment is advantageous when the rotors 10 are manufactured in large quantity.

Third Embodiment

While the rotor 2 of the rotary machine 1 of the foregoing first embodiment is structured such that the magnetic material pieces 8 are arranged on the outer surfaces of the individual permanent magnets 6 independently of one another, a rotor 20 of a rotary machine according to a third embodiment described below has a magnetic material piece 21 configured differently from the first embodiment. It is to be noted that elements identical or similar to those of the first embodiment are designated by the same reference numerals in the following discussion and accompanying drawings and a description of such elements is not given below.

Figure 8:
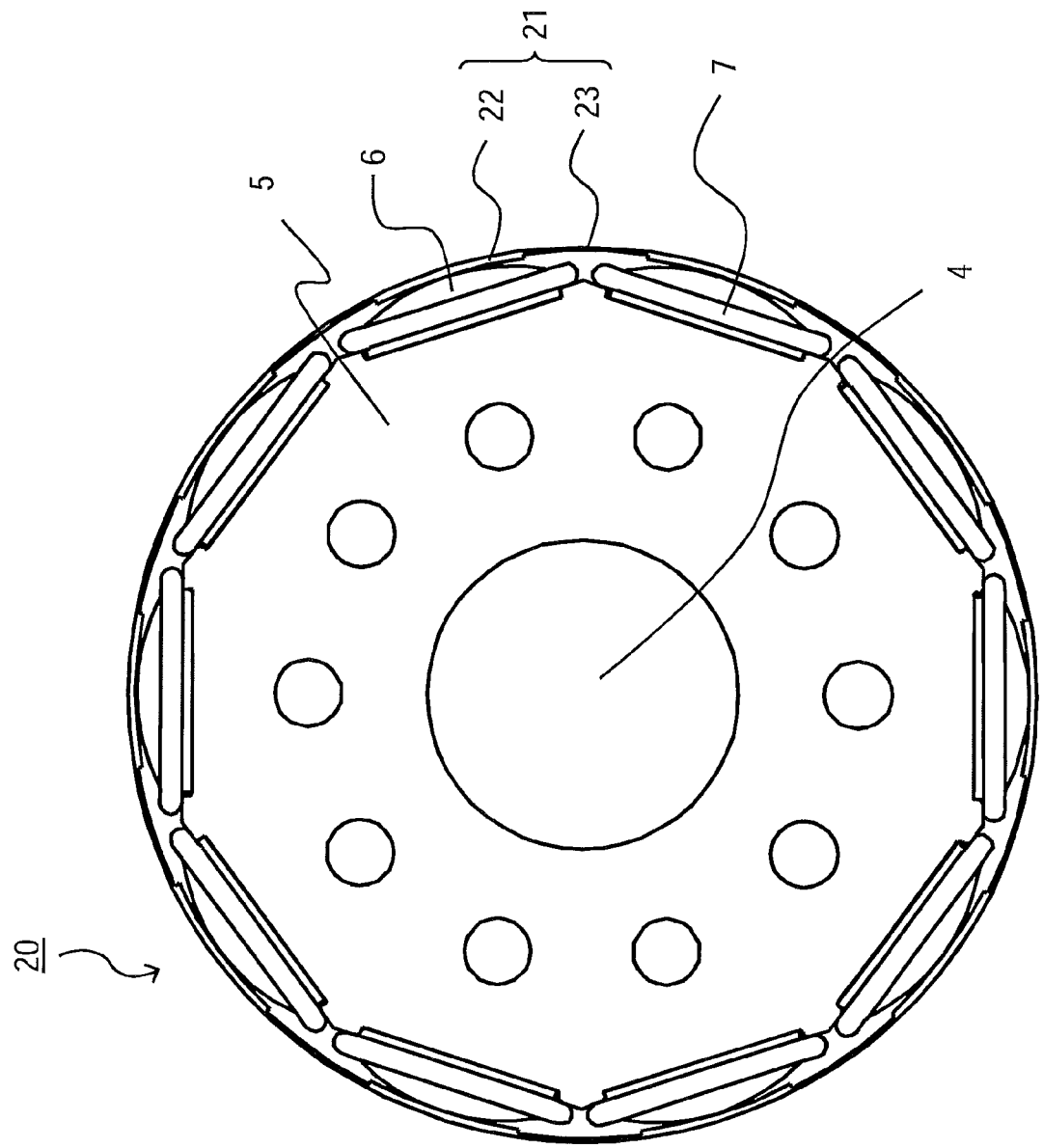
FIG. 8 is a plan view showing the structure of a rotor of a rotary machine according to a third embodiment of the invention.

FIG. 8 is a plan view showing the structure of the rotor 20 according to the third embodiment of the invention. As shown in FIG. 8, the magnetic material piece 21 of the rotor 20 of this embodiment is a generally cylindrical body of magnetic material including magnetic pole portions 22 and intra-pole portions 23. The magnetic pole portions 22 are so located as to cover the outer surfaces of the individual permanent magnets 6 at a middle part of each magnetic pole formed thereby in the circumferential direction, the thin-walled intra-pole portions 23 interconnecting the individual magnetic pole portions 22. The generally cylindrical magnetic material piece 21 thus structured covers an outermost surface of the rotor 20.

The intra-pole portions 23 have a wall thickness smaller than that of the magnetic pole portions 22 to thereby prevent leakage of magnetic flux in the q-axis direction. If the thickness of the magnetic pole portions 22 is approximately 0.1 to 0.5 mm, the thickness of the intra-pole portions 23 is made equal to or smaller than the thickness of the magnetic pole portions 22, preferably approximately 0.1 to 0.2 mm, for example.

Now, a manufacturing method of the magnetic material piece 21 is explained. One method of manufacturing the magnetic material piece 21 is to use an etching process, for example. The etching process chiefly used in the manufacture of printed circuit boards, for instance, is a technique for obtaining a desired pattern by removing part of a metal surface as a result of chemical dissolution thereof.

Figure 9:
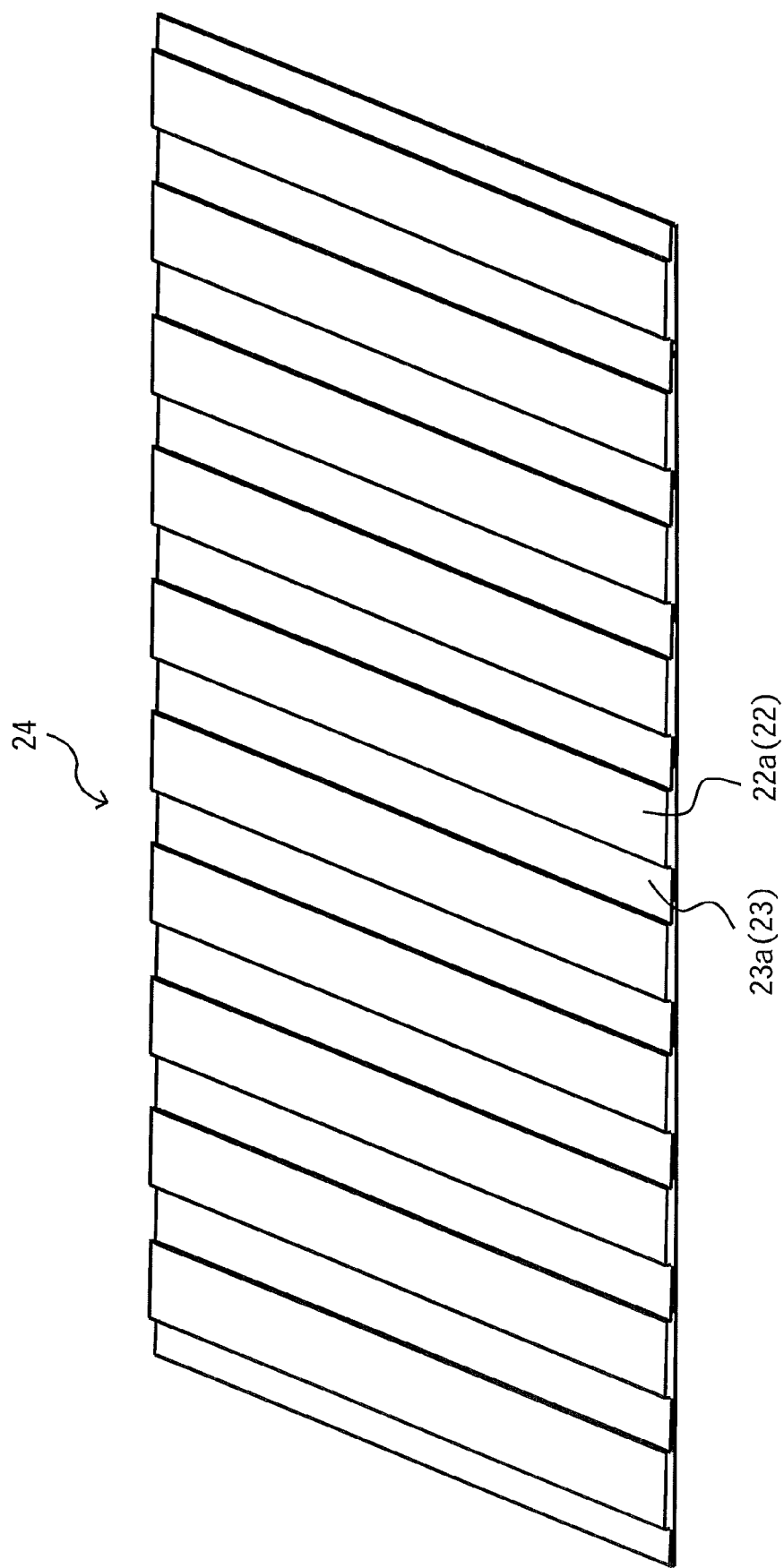
FIG. 9 is a perspective view showing the structure of a magnetic material sheet used in the rotor of the third embodiment.

FIG. 9 shows a magnetic material sheet 24 obtained by using the etching process. The magnetic material sheet 24 is produced by forming grooves 23a which serve as the intra-pole portions 23 in a workpiece like an electromagnetic steel sheet having the same thickness as the magnetic pole portions 22 by performing the etching process. Thick-walled parts 22a left unetched in the etching process serve as the magnetic pole portions 22. The generally cylindrical magnetic material piece 21 is produced by forming the magnetic material sheet 24 into a cylindrical shape and electrically joining opposite ends of the magnetic material sheet 24 to each other by welding or brazing, for instance.

The number of the grooves 23a formed in the aforementioned etching process is larger than the number of the magnetic poles by 1, the individual grooves 23a having the same width as the intra-pole portions 23. When the magnetic material sheet 24 is formed into the cylindrical shape by joining the opposite ends thereof, the grooves 23a formed at the opposite ends of the magnetic material sheet 24 join each other, together forming one intra-pole portion 23 having the specified width. As the generally cylindrical magnetic material piece 21 is configured in the aforementioned fashion with a joined part of the magnetic material sheet 24 constituting one of the intra-pole portions 23, the structure of the third embodiment causes a minimal effect on a magnetic circuit.

It is to be noted that the joined part of the generally cylindrical magnetic material piece 21 need not necessarily be located at one of the intra-pole portions 23. As an example, the joined part may be located at a boundary between one of the magnetic pole portions 22 and one of the adjoining intra-pole portions 23. In this case, the magnetic material sheet 24 should be etched in such a manner that the number of the grooves 23a equals the number of the magnetic poles and the groove 23a is formed at one end of the magnetic material sheet 24 while the thick-walled part 22a is formed at the other end. The magnetic material piece 21 can be made by forming the magnetic material sheet 24 thus produced into a cylindrical shape by joining the opposite ends.

Figure 10:
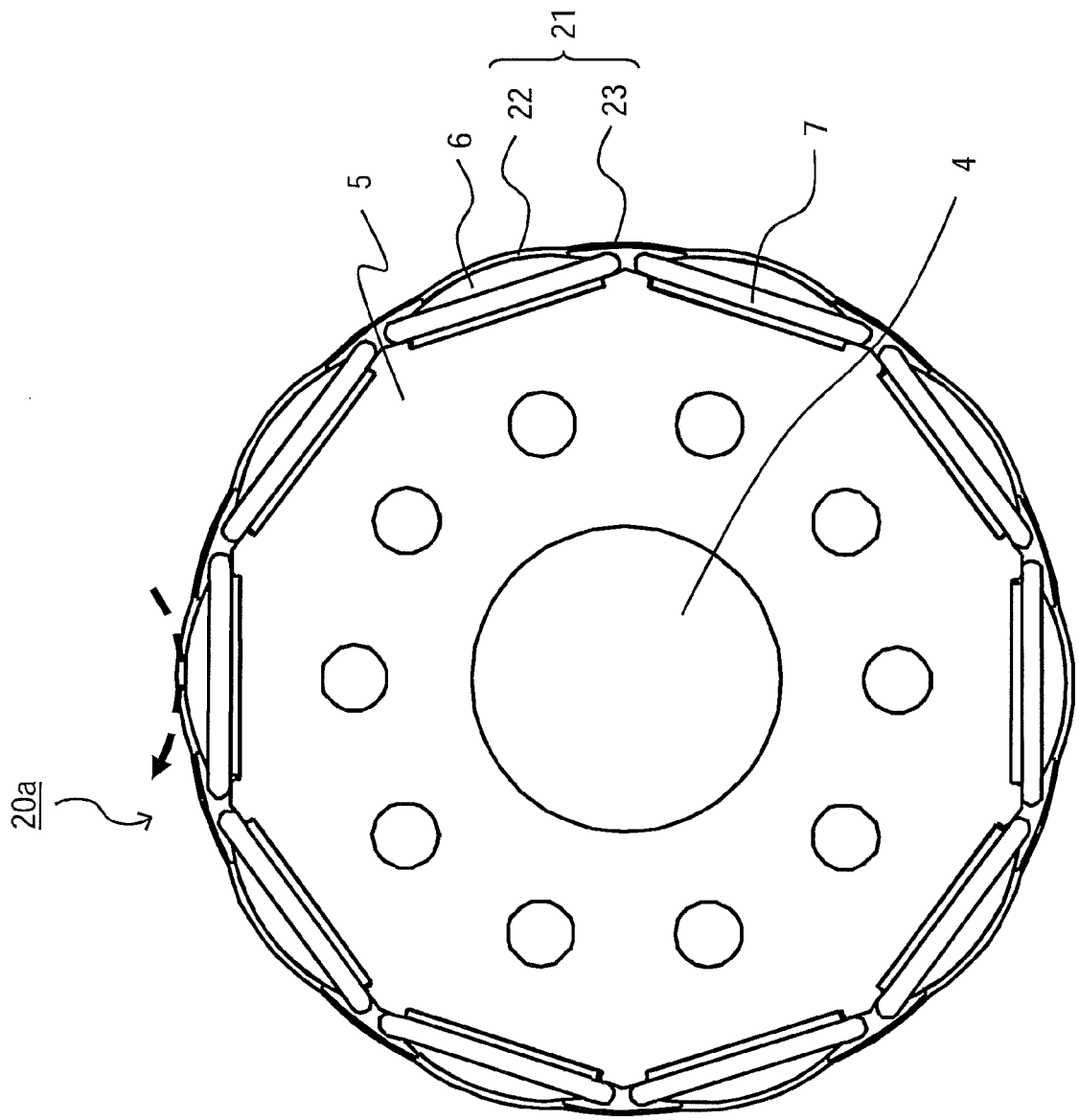
FIG. 10 is a plan view showing the structure of a rotor in one variation of the third embodiment of the invention.

FIG. 10 is a plan view showing the structure of a rotor 20a in one variation of the third embodiment of the invention. The rotor 20a of this variation is configured such that the magnetic pole portions 22 forming the generally cylindrical magnetic material piece 21 are arranged along the shape of each permanent magnet 6. This configuration serves to increase the value of magnetic flux flowing in the q-axis direction (shown by an arrow in a broken line in FIG. 10) and thereby increase the saliency of the rotor 20a. Since each of the permanent magnets 6 has an arc-shaped outer surface as seen in plan view in the third embodiment, the magnetic material piece 21 of this variation is formed in such a manner that the magnetic pole portions 22 lie along the arc-shaped outer surfaces of the permanent magnets 6 with boundary parts between the magnetic pole portions 22 and the intra-pole portions 23 bend inward.

The rotor 20 (20a) of the third embodiment has the generally cylindrical magnetic material piece 21 configured with the magnetic pole portions 22 and the intra-pole portions 23 as described above. Thus, the conducting circuits 7 and the magnetic pole portions 22 constituting the magnetic material piece 21 serve to increase the saliency of the rotor 20 (20a) as in the rotor 2 (10) of the foregoing first and second embodiments. Additionally, since the generally cylindrical magnetic material piece 21 surrounds the outermost surface of the rotor 20 (20a), it is possible to prevent the permanent magnets 6 and the conducting circuits 7 from breaking into pieces and scattering around. It is therefore unnecessary to provide a dedicated binding member unlike the first and second embodiments.

While the rotor 20 (20a) of the third embodiment has the conducting circuits 7 configured in the same way as in the first embodiment as illustrated in FIGS. 8 and 10, this structure may be modified to employ the same conducting circuit 11 as in the second embodiment.

While the invention has thus far been described with reference to the illustrative embodiments thereof, various modifications and alterations of this invention will be apparent to those skilled in the art without departing from the scope and spirit of the invention, and it should be understood that the invention is not limited to the illustrative embodiments set forth herein.

What is claimed is:

1. A rotor of a permanent magnet rotary machine, said rotor comprising:
   a rotary shaft;
   a rotor core fixed to a circumferential surface of said rotary shaft;
   a plurality of permanent magnets arranged on a circumferential surface of said rotor core at specific intervals along a circumferential direction thereof;
   a conducting circuit arranged to surround at least one of said permanent magnets forming one magnetic pole, said conducting circuit including a pair of first conductor sections arranged between magnetic poles formed by said adjacent permanent magnets and a second conductor section electrically connecting the first conductor sections; and
   a magnetic material piece arranged on an outer surface of said at least one permanent magnet surrounded by said conducting circuit.

2. The rotor of the permanent magnet rotary machine according to claim 1, wherein said conducting circuit surrounds only one of said permanent magnets forming one magnetic pole.

3. The rotor of the permanent magnet rotary machine according to claim 2, wherein said conducting circuit is arranged on each of said permanent magnets.

4. The rotor of the permanent magnet rotary machine according to claim 1, wherein the second conductor section is a generally ring-shaped conductor disposed at both axial ends of said rotor core and electrically connected to opposite axial ends of all of the first conductor sections.

5. The rotor of the permanent magnet rotary machine according to claim 1, wherein said magnetic material piece is arranged to surround a middle part of the magnetic pole formed by said at least one permanent magnet surrounded by said conducting circuit.

6. The rotor of the permanent magnet rotary machine according to claim 1, wherein said magnetic material piece is a generally cylindrical magnetic material piece including magnetic pole portions arranged on outer surfaces of said permanent magnets and thin-walled intra-pole portions interconnecting the individual magnetic pole portions.

7. The rotor of the permanent magnet rotary machine according to claim 6, wherein the thin-walled intra-pole portions are thinner than the magnetic pole portions.

8. The rotor of the permanent magnet rotary machine according to claim 1, wherein the magnetic material piece is arranged directly on the outer surface of the at least one permanent magnet.

9. The rotor of the permanent magnet rotary machine according to claim 1, wherein the outer surface of the at least one permanent magnet on which the magnetic material piece is arranged is a radially-facing outward surface.

10. The rotor of the permanent magnet rotary machine according to claim 1, wherein the width in the circumferential direction of said magnetic material piece is smaller than the width in the circumferential direction of said at least one permanent magnet forming one magnetic pole.

11. A method of manufacturing a rotor of a permanent magnet rotary machine which comprises:
   a rotary shaft;
   a rotor core fixed to a circumferential surface of said rotary shaft;
   a plurality of permanent magnets arranged on a circumferential surface of said rotor core at specific intervals along a circumferential direction thereof;
   a conducting circuit arranged to surround at least one of said permanent magnets forming one magnetic pole, said conducting circuit including a pair of first conductor sections arranged between magnetic poles formed by said adjacent permanent magnets and a second conductor section electrically connecting the first conductor sections; and
   a magnetic material piece arranged on an outer surface of said at least one permanent magnet surrounded by said conducting circuit;
   wherein said magnetic material piece is a generally cylindrical magnetic material piece including magnetic pole portions arranged on the outer surfaces of said permanent magnets and thin-walled intra-pole portions interconnecting the individual magnetic pole portions, said method of manufacturing the rotor of the permanent magnet rotary machine being characterized by comprising the steps of:

forming a magnetic material sheet having grooves which serve as the intra-pole portions and thick-walled parts which serve as the magnetic pole portions by etching a workpiece; and forming said generally cylindrical magnetic material piece by joining opposite ends of the magnetic material sheet to each other.

12. The method according to claim 11, wherein the thin-walled intra-pole portions are thinner than the magnetic pole portions.

* * * * *